US010061596B2

(12) United States Patent
Dasar et al.

(10) Patent No.: US 10,061,596 B2
(45) Date of Patent: Aug. 28, 2018

(54) SYSTEMS AND METHODS FOR LOADING FIRMWARE MODULES

(71) Applicant: Dell Products L.P., Round Rock, TX (US)

(72) Inventors: Sundar Dasar, Round Rock, TX (US); Yogesh Prabhakar Kulkarni, Round Rock, TX (US); Vigneswaran Ponnusamy, Round Rock, TX (US); Sumanth Vidyadhara, Bangalore (IN); Jon Robert Hass, Austin, TX (US); Elie Antoun Jreij, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 14/796,096

(22) Filed: Jul. 10, 2015

(65) Prior Publication Data
US 2017/0010899 A1 Jan. 12, 2017

(51) Int. Cl.
*G06F 1/00* (2006.01)
*G06F 9/4401* (2018.01)
*G06F 13/42* (2006.01)
*G06F 8/654* (2018.01)
*G06F 8/61* (2018.01)

(52) U.S. Cl.
CPC ............ *G06F 9/4416* (2013.01); *G06F 8/654* (2018.02); *G06F 9/4411* (2013.01); *G06F 13/4282* (2013.01); *G06F 8/64* (2013.01)

(58) Field of Classification Search
CPC ........ G06F 9/4416; G06F 8/65; G06F 9/4411; G06F 13/4282
See application file for complete search history.

(56) References Cited

U.S. PATENT DOCUMENTS

| 5,230,052 A * | 7/1993 | Dayan ..................... H04L 29/06 713/2 |
| 8,589,302 B2 * | 11/2013 | Prakash ................. G06F 21/572 705/50 |
| 2002/0194313 A1 * | 12/2002 | Brannock ................. G06F 8/65 709/220 |
| 2007/0050426 A1 * | 3/2007 | Dubal ....................... G06F 8/65 |
| 2009/0006834 A1 * | 1/2009 | Rothman .................. G06F 8/65 713/2 |
| 2013/0007437 A1 * | 1/2013 | Shroni .................... G06F 8/665 713/2 |

(Continued)

OTHER PUBLICATIONS

Definition of "executable", Microsoft Computer Dictionary, 5th ed. (2002), p. 200.

*Primary Examiner* — Jaweed A Abbaszadeh
*Assistant Examiner* — Gayathri Sampath
(74) *Attorney, Agent, or Firm* — Jackson Walker L.L.P.

(57) ABSTRACT

In accordance with embodiments of the present disclosure, a method may include during boot of the information handling system, in response to one of a system management request received by a management controller or user input indicative of a task received during boot, downloading, by a basic input/output system (BIOS), from a network database communicatively coupled to the network interface, one or more executable modules for completing a system management request or a task. The method may also include executing the one or more downloaded modules.

19 Claims, 2 Drawing Sheets

(56) References Cited

U.S. PATENT DOCUMENTS

2013/0179872 A1* 7/2013 Kuzmack ............... G06F 8/665
                                                              717/173
2014/0351571 A1* 11/2014 Jacobs ................. G06F 21/575
                                                               713/2
2015/0178096 A1* 6/2015 Inbaraj .................... G06F 8/65
                                                               713/2

* cited by examiner

SYSTEMS AND METHODS FOR LOADING FIRMWARE MODULES

TECHNICAL FIELD

The present disclosure relates in general to information handling systems, and more particularly to methods and systems for remote loading of firmware modules by a basic input/output system or management controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many existing information handling systems include a management controller allowing for remote out-of-band management and control of the information handling systems via a management console using a communications channel physically isolated from an in-band communications channel used by such information handling systems. A typical management controller may include flash memory for storing lifecycle controller code, responsible for deployment of firmware updates to its associated information handling system. However, to reduce cost and physical space, future designs of information handling systems may exclude or significantly reduce the size of memory within or available to a management controller. Thus, staging of firmware updates and configurations and storing of system firmware management modules on the management controller may no longer be available, as it is in many existing implementations.

SUMMARY

In accordance with the teachings of the present disclosure, the disadvantages and problems associated with existing approaches to loading of firmware modules may be reduced or eliminated.

In accordance with embodiments of the present disclosure, an information handling system may include a processor, a memory communicatively coupled to the processor, a management controller communicatively coupled to the processor and configured to provide out-of-band management of the information handling system, a network interface communicatively coupled to the processor, and a basic input/output system (BIOS) comprising a program of instructions executable by the processor and configured to cause the processor to initialize one or more information handling resources of the information handling system. The BIOS may be further configured to, during boot of the information handling system, in response to one of a system management request received by the management controller or user input indicative of a task received during boot, download from a network database communicatively coupled to the network interface one or more executable modules for completing the system management request or the task and execute the one or more downloaded modules.

In accordance with these and other embodiments of the present disclosure, a method may include during boot of the information handling system, in response to one of a system management request received by a management controller or user input indicative of a task received during boot, downloading, by a basic input/output system (BIOS), from a network database communicatively coupled to the network interface, one or more executable modules for completing a system management request or a task. The method may also include executing the one or more downloaded modules.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to, during boot of the information handling system, in response to one of a system management request received by a management controller or user input indicative of a task received during boot, download, by a basic input/output system (BIOS), from a network database communicatively coupled to the network interface one or more executable modules for completing a system management request or a task and execute the one or more downloaded modules.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
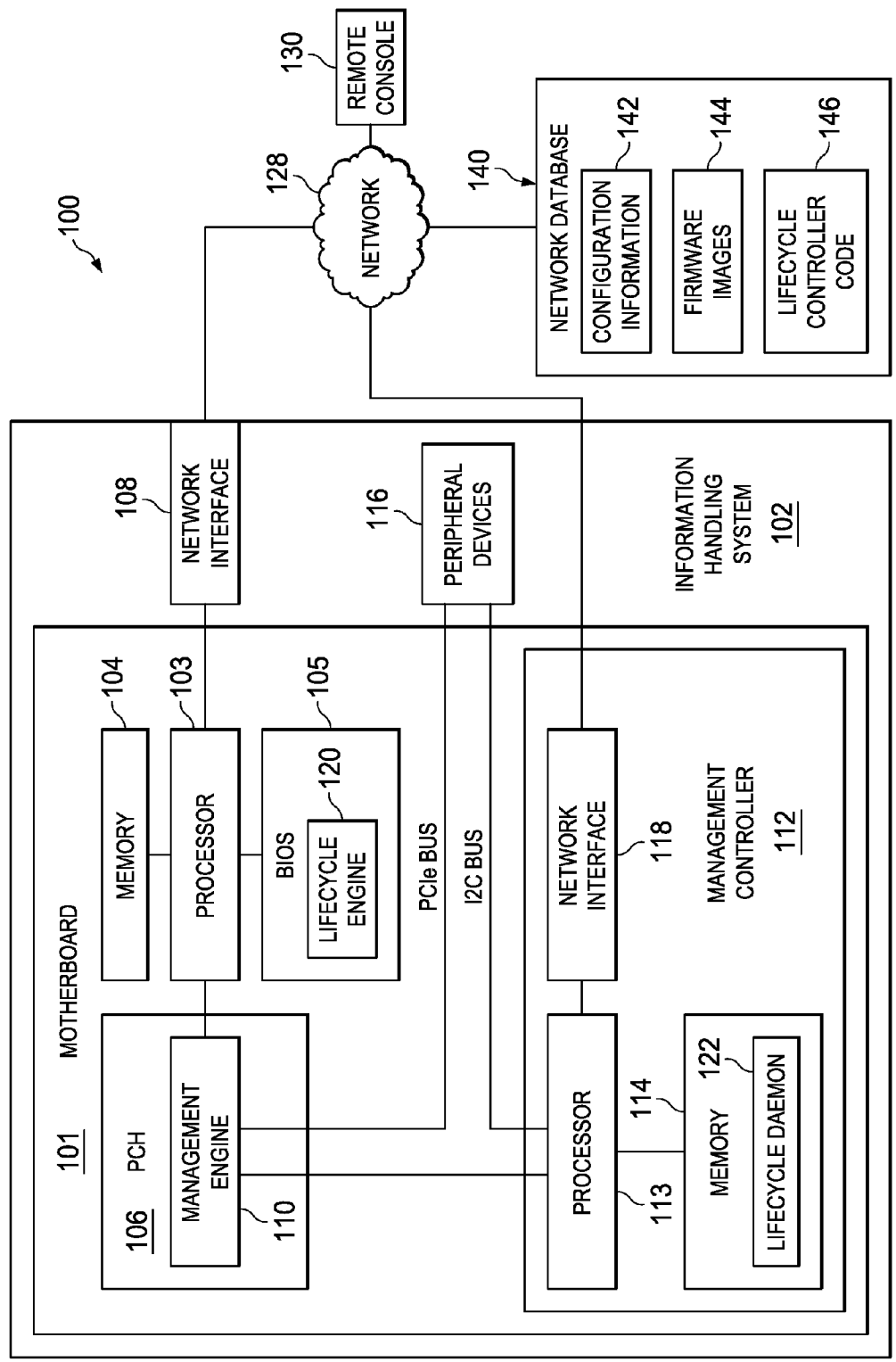
FIG. 1 illustrates a block diagram of an example system for loading of firmware modules, in accordance with embodiments of the present disclosure.
Figure 2:
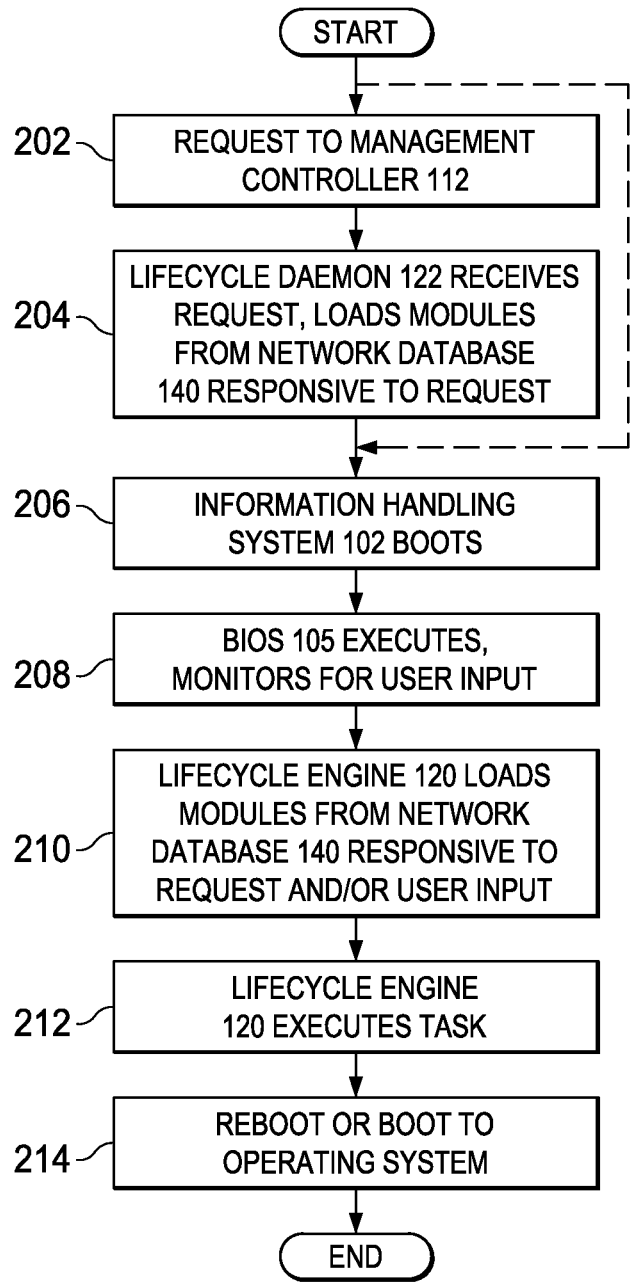
FIG. 2 illustrates a flow chart of an example method for loading of firmware modules, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for loading of firmware modules, in accordance with embodiments of the present disclosure. As shown in FIG. 1, system 100 may include an information handling system 102, a network 128, a remote console 130, and a network database 140.

In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101, a network interface 108 communicatively coupled to a processor 103 of motherboard 101, and one or more peripheral devices 116 communicatively coupled to processor 103.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, a platform controller hub (PCH) 106 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. One such function may include management engine 110. Management engine 110 may comprise hardware and/or firmware that enables remote out-of-band management for information handling system 102 in order to monitor, maintain, update, upgrade, and/or repair information handling system 102. In some embodiments, management engine 110 may include hardware and firmware compliant with Intel's Active Management Technology or Node Manager.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 105 may also include lifecycle engine 120. Lifecycle engine 120 may include any system, device, or apparatus configured to, based on user actions and/or an automated process (e.g., a command from a remote console), load configuration information 142 from network database 140 and/or perform system management tasks, as described in greater detail below. In these and other embodiments, lifecycle engine 120 may load lifecycle controller code 146 from network database 140, store lifecycle controller code 146 in system memory 104, and retain such portion of memory 104 after reboot so that management controller 112 may execute lifecycle controller code 146. In these and other embodiments, lifecycle engine 120 may also be configured to manage dependencies among images and/or modules retrieved from network database 140. In some embodiments, lifecycle engine 120 may comprise a program of instructions which may be read and executed by processor 103 to carry out the functionality of lifecycle engine 120. In these and other embodiments, lifecycle engine 120 may reside in a Serial Peripheral Interface (SPI) flash memory associated with BIOS 105 and may be loaded by a Driver Execution Environment (DXE) portion of BIOS 105.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

As shown in FIG. 1, memory 114 may have stored thereon lifecycle daemon 122. Lifecycle daemon may 122 include any system, device, or apparatus configured to monitor for system management requests (e.g., in-band requests from an operating system executing on processor 103 and/or out-of band-requests from remote console 130) and load appropriate images and/or modules from network database 140 in order to carry out such requests. In some embodiments, lifecycle daemon 122 may comprise a program of instructions which may be read and executed by processor 113 to carry out the functionality of lifecycle daemon 122.

Network interface 118 may comprise any suitable system, apparatus, or device operable to serve as an interface between management controller 112, network 128, and/or one or more other information handling systems. Network interface 118 may enable management controller 112 to communicate using any suitable transmission protocol and/or standard. In these and other embodiments, network interface 118 may comprise a network interface card, or "NIC."

Network interface 108 may comprise any suitable system, apparatus, or device operable to serve as an interface between information handling system 102, network 128, and/or and one or more other information handling systems. Network interface 108 may enable information handling system 102 to communicate using any suitable transmission protocol and/or standard. In these and other embodiments, network interface 108 may comprise a network interface card, or "NIC."

Each peripheral device 116 may be communicatively coupled to processor 103 and may generally include any information handling resource. As shown in FIG. 1, peripheral devices 116 may also be coupled to processor 113 via an inter-integrated circuit (I2C) bus and/or via a PCIe bus. Processor 113 can communicate directly to peripheral devices via PCIe except for some messages that require a PCIe root complex. For these messages, management engine 110 may serve as a proxy between processor 113 and peripheral devices 116.

Network 128 may be a network and/or fabric configured to couple information handling system 102, remote console 130, and/or one or more other information handling systems to one another. In these and other embodiments, network 128 may include a communication infrastructure, which provides physical connections, and a management layer, which organizes the physical connections and information handling systems communicatively coupled to network 128. Network 128 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 128 may transmit data via wireless transmissions and/or wireline transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 128 and its various components may be implemented using hardware, software, or any combination thereof.

Remote console 130 may comprise any information handling system including requisite hardware, software, and/or firmware for interfacing with management controller 112 via network interface 118 in order to facilitate remote management of information handling system 102 by remote console 130. In some embodiments, such remote management may be in accordance with Intelligent Platform Management Interface (IPMI) and/or another suitable interface or standard.

Network database 140 may comprise an information handling system, storage controller, or computer-readable medium communicatively coupled to network 128 and having stored thereon one or more images and/or modules for retrieval by lifecycle engine 120 and/or lifecycle daemon 122. For example, network database may include configuration information 142 relevant information handling system 102, firmware images 144 for information handling system 102, lifecycle controller code 146 for execution by management controller 112, and/or other data or instructions. Network database 140 may also be used as a rollback facility, to allow information handling system system 102 to "rollback" to a known configuration in the event a firmware update causes problems.

FIG. 2 illustrates a flow chart of an example method 200 for loading of firmware modules, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, a system management request may be made to management controller 112 either in-band (e.g., via an in-band transport between management controller 112 and an operating system executing on processor 103) or out-of-band (e.g., from remote console 130 via network interface 118).

At step 204, lifecycle daemon 122 may receive the request and may download modules (e.g., configuration information 142, firmware images 144) from network database 140 via network interface 118 responsive to the request. In some embodiments, lifecycle daemon 122 may store such downloaded modules in system memory 104 (e.g., by issuing a system management interrupt to store such modules in memory 104). Such downloaded modules may be stored to a portion of memory 104 that is maintained during a reboot of information handling system 102. In some of such embodiments, such portion of memory 104 may comprise a RAM drive. After receipt and storage of the modules responsive to the request, management controller 112 may cause information handling system 102 to boot or reboot.

In some instances, method 200 may start at 206 instead of step 202. In other instances, such as when a system management request is received at steps 202 and 204, step 206 may execute is response to such system management request. At step 206, information handling system 102 may boot.

At step 208, BIOS 105 may execute, monitoring for user input (e.g., the pressing of one or more hotkeys) for executing a particular task. For example, a user may input a particular keystroke to perform a firmware update, may input another particular keystroke to execute system diagnostics, or may input another particular keystroke to load new configuration information for a component of information handling system 102.

At step 210, if user input is received at step 208 or a system management request is issued during steps 202 and 204, lifecycle engine 120 may load modules for the request or for the user input from network database 140. For example, if user input received at step 208 is to perform a firmware update, lifecycle engine 120 may download from network database 140 executable code necessary to perform such firmware update, as well as the firmware update itself from firmware images 144. As another example, if a system management request at steps 202 and 204 includes a request to update BIOS 105, lifecycle engine 120 may download from network database 140 executable code necessary to perform such BIOS update, as well as the BIOS update itself from firmware images 144.

At step 212, lifecycle engine 120 may execute the task indicated by the user input or system management request. At step 214, lifecycle engine 120 may issue a command to reboot information handling system 102 or to boot to an operating system. After completion of step 214, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 200 or any other system operable to implement method 200. In certain embodiments, method 200 may be implemented partially or fully in software and/or firmware embodied in computer-readable media.

The systems and methods described above may be further illustrated by way of example use cases. For example, in some embodiments, the systems and methods described herein may be used to perform a pre-boot update to BIOS 105. Based on user actions (e.g., system management request or user input during boot), lifecycle engine 120 may download firmware images 144 and/or other modules for carrying out the BIOS update from network database 140 and authenticate such firmware images 144. After download, such modules may execute in order to complete the BIOS update. In some instances, lifecycle engine 120 may also manage dependencies among downloaded modules, such that modules are executed in the correct order needed to complete the update. To illustrate, for a BIOS update, two different firmware modules, a systems management firmware module and a security firmware module may need to be executed to complete an installation. In such a scenario, lifecycle engine 120 may first download and execute the security firmware module, which may authenticate the integrity of the firmware update to be performed. Next, lifecycle engine 120 may download the system management firmware module in order to perform an inventory of information handling system, determines which firmware modules are suitable in view of such inventory, and then performs necessary BIOS updates.

As another example, the systems and methods described herein may be used to perform out-of-band configuration on information handling system 102. To illustrate, a user at remote console 130 may issue a system management request to management controller 112 for a configuration task to be performed. In response, lifecycle daemon 122 may, if the host system of processor 103 is powered on, load modules for carrying out the task from a portion of system memory 104 dedicated to lifecycle daemon 122. As noted above, lifecycle controller code 146 may be stored in a portion of system memory 104 by lifecycle engine 120. In some embodiments, such portion of memory 104 may comprise a RAM drive. If the host system is powered off, lifecycle daemon 122 may set a flag or other variable to undertake the configuration on a subsequent boot of information handling system 102. Lifecycle daemon 122 in concert with lifecycle controller code 146 may then stage modules and data needed to complete the configuration in the portion of system memory 104 dedicated to lifecycle daemon 122. After staging the job, lifecycle daemon 122 may cause a reboot of information handling system 102, and the portion of system memory 104 comprising the staged update modules and data may be maintained. Upon reboot, lifecycle engine 120 may, responsive to a flag or other variable set by lifecycle daemon 122 indicating a configuration, download from network database 140 executable modules needed to undertake the requested configuration. Lifecycle engine 120 may then apply the configuration, and upload the updated configuration information back to network database 140.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a memory communicatively coupled to the processor;
   a management controller communicatively coupled to the processor and configured to provide out-of-band management of the information handling system;
   a network interface communicatively coupled to the processor; and
   a basic input/output system (BIOS) comprising a program of instructions executable by the processor and configured to cause the processor to initialize one or more information handling resources of the information handling system, and further configured to:
      during boot of the information handling system, in response to at least one of a system management request received by the management controller or user input indicative of a task received during boot, download from a network database communicatively coupled to the network interface executable modules for completing the system management request or the task, wherein the executable modules include lifecycle controller code configured to, in concert with the management controller, provide out-of-band management of the information handling system, wherein the executable modules include at least a security executable module configured to authenticate other ones of the executable modules and an inventory executable module configured to determine which executable modules are needed; and
      execute the downloaded modules.

2. The information handling system of claim 1, wherein the system management request or the task comprises one of a request to update a configuration of the information handling system and request to update firmware of the information handling system.

3. The information handling system of claim 1, the management controller further configured to:
   receive the system management request;
   download from the network database the executable modules for completing the system management request; and
   store the executable modules in a portion of the memory dedicated to the management controller.

4. The information handling system of claim 3, wherein the portion of memory comprises a RAM drive.

5. The information handling system of claim 1, the BIOS further configured to:
   store the lifecycle controller code in a portion of the memory dedicated to the management controller.

6. The information handling system of claim 5, wherein the portion of memory comprises a RAM drive.

7. The information handling system of claim 1, wherein the BIOS comprises a Unified Extensible Firmware Interface.

8. A method comprising:
   during boot of an information handling system, in response to at least one of a system management request received by a management controller or user input indicative of a task received during boot, downloading, by a basic input/output system (BIOS), from a network database communicatively coupled to a network interface, executable modules for completing the system management request or the task, wherein the executable modules include lifecycle controller code configured to, in concert with the management controller, provide out-of-band management of the information handling system, wherein the executable modules include at least a security executable module configured to authenticate other ones of the executable modules and an inventory executable module configured to determine which executable modules are needed; and
   executing the downloaded modules.

9. The method of claim 8, wherein the system management request or the task comprises one of a request to update a configuration of the information handling system and an update to firmware of the information handling system.

10. The method of claim 8, further comprising:
    receiving, by the management controller, the system management request;
    downloading, by the management controller, from the network database, the executable modules for completing the system management request; and
    storing, by the management controller, the executable modules in a portion of memory dedicated to the management controller.

11. The method of claim 10, wherein the portion of memory comprises a RAM drive.

12. The method of claim 8, further comprising:
storing, by the BIOS, the lifecycle controller code in a portion of memory dedicated to the management controller.

13. The method of claim 12, wherein the portion of memory comprises a RAM drive.

14. The method of claim 8, wherein the BIOS comprises a Unified Extensible Firmware Interface.

15. An article of manufacture comprising:
a non-transitory computer-readable medium; and
computer-executable instructions carried on the computer-readable medium, the instructions readable by a processor, the instructions, when read and executed, for causing the processor to:
during boot of an information handling system, in response to at least one of a system management request received by a management controller or user input indicative of a task received during boot, download, by a basic input/output system (BIOS), from a network database communicatively coupled to the network interface executable modules for completing the system management request or the task, wherein the executable modules include lifecycle controller code configured to, in concert with the management controller, provide out-of-band management of the information handling system, wherein the executable modules include at least a security executable module configured to authenticate other ones of the executable modules and an inventory executable module configured to determine which executable modules are needed; and
execute the downloaded modules.

16. The article of claim 15, wherein the system management request or the task comprises one of a request to update a configuration of the information handling system and update firmware of the information handling system.

17. The article of claim 15, the instructions for further causing the processor to:
store the lifecycle controller code in a portion of memory dedicated to the management controller.

18. The article of claim 17, wherein the portion of memory comprises a RAM drive.

19. The article of claim 15, wherein the BIOS comprises a Unified Extensible Firmware Interface.

* * * * *